Figure 1:
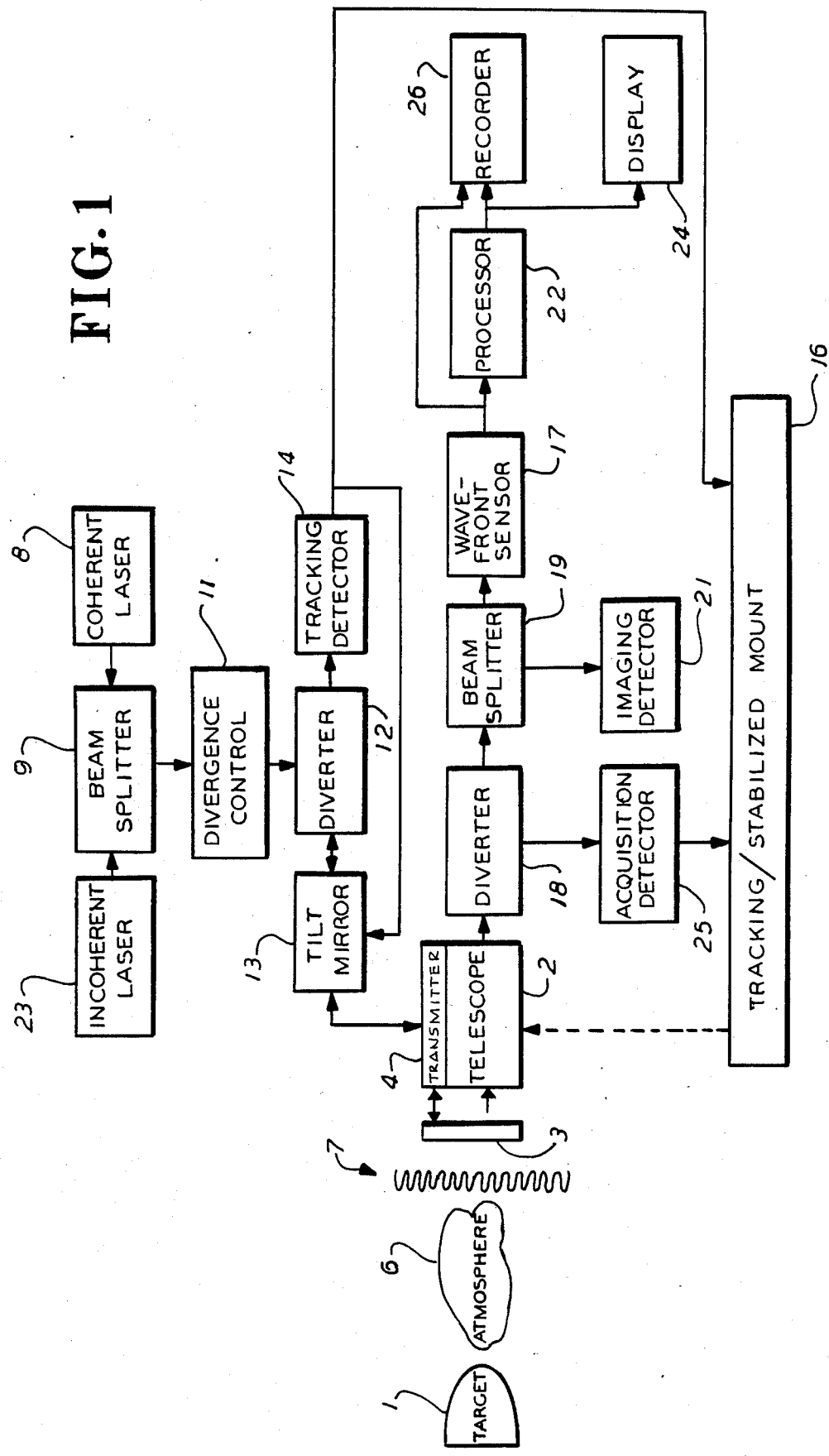

United States Patent [19]

Hutchin

[11] Patent Number: 4,688,086
[45] Date of Patent: Aug. 18, 1987

[54] METHOD OF IMAGING A TARGET ILLUMINATED THROUGH AN OPTICALLY DISTORTING REGION

[75] Inventor: Richard A. Hutchin, Marlboro, Mass.

[73] Assignee: Itek Corporation, Lexington, Mass.

[21] Appl. No.: 721,681

[22] Filed: Jun. 18, 1985

[51] Int. Cl.[4] .............................................. H04N 7/18
[52] U.S. Cl. ....................................... 358/95; 356/353
[58] Field of Search .................. 358/95; 356/354, 353, 356/346, 345, 360, 349, 361, 5

[56] References Cited

U.S. PATENT DOCUMENTS

| | | | |
|---|---|---|---|
| 3,723,648 | 3/1973 | Cornsweet | 358/95 |
| 4,025,195 | 5/1977 | Ebersole et al. | 356/345 X |
| 4,095,900 | 6/1978 | Murphy et al. | 356/354 X |
| 4,533,247 | 8/1985 | Epworth | 356/346 X |

Primary Examiner—Stephen C. Buczinski
Assistant Examiner—Linda J. Wallace
Attorney, Agent, or Firm—Michael H. Wallach; Robert F. Rotella

[57] ABSTRACT

A target is illuminated through an optically distorting region, such as atmospheric turbulence or non-precision optics, by coherent light and a first set of data is recorded indicative of the complex amplitude of scattered radiation and such target is thereafter illuminated by incoherent light to produce a second set of data indicative of the nature of the region; the second set is divided into the first set, and the resulting data is Fourier-transformed to produce a diffraction-limited target image.

12 Claims, 2 Drawing Figures

METHOD OF IMAGING A TARGET ILLUMINATED THROUGH AN OPTICALLY DISTORTING REGION

BACKGROUND OF THE INVENTION

The present invention relates to the field of imaging distant targets.

There are many situations of practical military and intelligence importance where high-resolution images of distant objects are required but cannot be obtained by conventional imaging techniques. Factors such as atmospheric turbulence, internal optical aberrations, and vibration often prevent imaging systems from achieving diffraction-limited performance. It is known in the art, to illuminate a distant object or target with a narrow band laser pulse, which when scattered from the target forms a high quality speckle image pattern at the wavefront sensor aperture receiving returned light. The speckle pattern may be measured with respect to amplitude and phase using conventional interferometer techniques. If there were no aberrations due to the atmospheric or optical element distortion, the resulting wavefront pattern could be Fourier-transformed to produce a diffraction-limited target image. However, when aberrations are present, a severely degraded image will be produced and the effects thereof must be corrected before the transformation process takes place. Such a correction may be accomplished in real time by measuring the aberrations and removing them with an active electronically controlled deformable mirror. For certain applications however, it is desirable to replace the active optic correction systems with a system which enables extremely large-sized telescopes to be employed, which do not require precision optical elements, and can be made at surprisingly small expense. The elimination of the high cost, complexity, and power requirements of such active optical systems is a desired goal of the present invention.

It is thus an object of the present invention to enable the photographing of satellites or other objects through atmospheric turbulence, from large ground-based telescopes with high resolution.

It is a further object of the present invention to provide a method and means for producing high-resolution imagery from space-based telescopes subject to severe unknown aberrations, as may occur for example in space, where high-energy laser weapons systems are employed.

A further object of the present invention is to provide for the imaging of targets through atmospheric turbulence which results in very high quality images of the target, without the use of the relative costly and complex active optical element system for compensating for image distortion automatically.

It is yet a further object of the present invention to provide huge telescopes (perhaps 30 meters or more in diameter, which do not require precisely fabricated optical elements) for producing high-resolution images (in spite of possible turbulent viewing conditions) at relatively low cost.

SUMMARY OF THE INVENTION

In accordance with a preferred method and system of the present invention, a target is first illuminated through atmospheric turbulence by directing a narrow band laser pulse at the target, which forms a high quality speckle image at the aperture of a wavefront sensor receiving rebounded light, which in turn produces first set of digital data measuring the complex amplitude of the wavefront containing the complex product of target information and image degrading aberrations caused by turbulence. Shortly thereafter, before a change of state of the turbulence, the target is illuminated with an incoherent light source such as a broadband laser, and a second resulting wavefront is recorded to produce a second set of digital data indicative of the complex amplitude due only to optical aberrations, since the target speckle pattern is washed out at the wavefront sensor aperture by such illumination. The first set of data is divided by the second set of data and the result is a third set of data giving the complex amplitude of pure target information, which is Fourier-transformed to produce a diffraction-limited target image.

Figure 2:
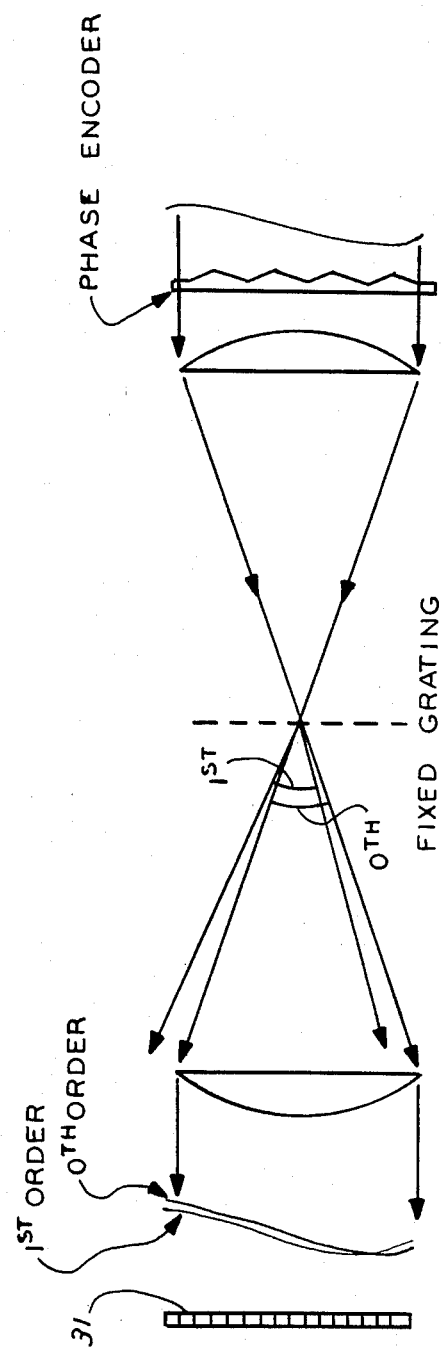

Other objects, features, and advantages of the present invention will become apparent upon study of the following specific description, taken in conjunction with the drawings in which:

FIG. 1 schematically illustrates one arrangement for carrying out the present invention;

FIG. 2 illustrates an interferometer schematic which is employed to input the digital circuitry indicative of the measured parameters.

SPECIFIC DESCRIPTION

Referring now to FIG. 1, a target 1 such as an airplane, for example, is viewed by telescope 2, having window element 3 associated therewith. A light transmitter 4 directs the above-mentioned bursts of light at the target through the atmosphere 6 having one or more turbulent layers such as boundary layer 7. The first step of the method of the invention is to activate coherent laser 8, which transmits light to transmitter 4 via conventional elements, including beam splitter 9, divergence control device 11, diverter 12, and tip/tilt mirror 13 which is employed to track the target. Such tracking forms no part of the present invention, and is executed by conventional means employing tracking detector 14 and tracking/stabilized mount 16, which contains to shift the optical axis of telescope 2 as it follows the moving target.

The activation of coherent laser 8, causes the target 1 to be illuminated through the atmosphere by a narrow band laser pulse, and the rebounded light forms a high quality speckle image at the aperture of wavefront sensor 17, which receives light transmitted by the receiving telescope to wavefront sensor 17, via diverter 18 and beam splitter 19. Imaging detector 21 is employed to monitor the imaging process. A first set of digital data is produced by electronically scanning the speckle image of the wavefront by means of a two-dimensional charge-coupled array device 31 shown in FIG. 2. The first set of digital data is forwarded to processor 22, which operates upon the data as explained below.

Incoherent laser 23 is activated shortly after the activation of coherent laser 8 before a substantial change of state of the turbulence, and causes transmitter 4 to direct broadband laser light at the target, and a second resulting wavefront due to rebound light is measured as before, to produce a second set of digital data which is indicative of the optical path atmospheric aberrations only, since the target speckle pattern is washed out.

Within the processor, the first set of data is divided by the second set by conventional digital processing techniques and the result is a third set of data indicative of pure target information which is thereafter Fourier-transformed to enable production of a diffraction-limited target image, which may be displayed on display console 24 or recorded by recorder 26. By virtue of the division process, atmospheric turbulence-induced distortions and/or optical distortions of the elements of telescope 2, if any, are cancelled out.

Wavefront sensor 17 could comprise an ac shearing interferometer outputted to CCD array 31 as indicated in FIG. 2; see U.S. Pat. Nos. 3,923,400 and 3,829,219. A dc shearing interferometer coupled to a processor employing the known four-bin algorithm may also be employed. See U.S. patent application Ser. No. 621,408, filed June 18, 1984, now U.S. Pat. No. 4,575,208, in the name of B. Horowitz and A. MacGovern, and assigned to the same assignee as the present invention.

The invention may be utilized by steps and devices other than those described and thus the invention is to be limited only by the language of the following claims and equivalents.

I claim:

1. Method of imaging a target by directing electromagnetic radiation at said target through an optically distorting region bending said radiation therethrough comprising the steps of:
   a. illuminating said target by projecting narrow band coherent electromagnetic radiation through said region at said target;
   b. recording a first set of data indicative of the complex amplitude of said radiation scattered by said target back through said region as a result of step a, said first set of data containing information indicative of the nature of said target and said turbulent region;
   c. illuminating said target with broadband incoherent electromagnetic radiation;
   d. recording a second set of data indicative of the complex amplitude of said radiation scattered as a result of step c, said second set of data indicative of the nature of said region;
   e. combining said first and second sets of data for producing a third set of data devoid of data indicative of the nature of said region; and
   f. Fourier-transforming said third set of data to reconstruct the image of said target.

2. The method of claim 1 wherein said second set of data is divided into said first set of data.

3. The method of claims 1 or 2 wherein said electromagnetic radiation comprises light rays.

4. Apparatus for imaging a target by directing electromagnetic radiation at said target through an optically distorting region bending said radiation passing therethrough comprising:
   a. means for illuminating said target by projecting narrow band coherent electromagnetic radiation through said region at said target;
   b. means for recording a first set of data indicative of the complex amplitude of said radiation scattered by said target back through said region as a result of target illumination, by the means of paragraph a;
   c. means for illuminating said target with broadband incoherent electromagnetic radiation;
   d. means for recording a second set of data indicative of the complex amplitude of said radiation scattered by said region as a result of target illumination by the means of paragraph c;
   e. means for dividing said second set of data into said first set of data; and
   f. means for Fourier-transforming said third set of data to reconstruct the image of said target.

5. The apparatus as set forth in claim 4 wherein the recordation means of paragraphs b and d include an interferometer for producing an interference pattern indicative of wavefront shape together with means for electronically scanning said interference pattern for producing said first and second sets of data.

6. Apparatus of claim 4 or 5 wherein said electromagnetic radiation comprises light having wavelengths within a band extending from the infrared region through the ultraviolet region.

7. Apparatus of claim 6 wherein said radiation is visible light.

8. Apparatus of claims 4 or 5 wherein said means for illuminating of paragraph a comprises a coherent laser.

9. Apparatus of claim 6 wherein said means for illuminating of paragraph a comprises a coherent laser.

10. Apparatus of claims 4 or 5 wherein said means for illuminating of paragraph c comprises an incoherent laser.

11. Apparatus of claim 6 wherein said means for illuminating of paragraph c comprises an incoherent laser.

12. Apparatus of claim 8 wherein said means for illuminating of paragraph c comprises an incoherent laser.

* * * * *